United States Patent
Toiyama

(10) Patent No.: US 6,695,105 B2
(45) Date of Patent: Feb. 24, 2004

(54) HYDRAULIC SHOCK ABSORBER

(75) Inventor: Yoshiro Toiyama, Tokyo (JP)

(73) Assignee: Kayaba Industry Co., Ltd., Tokyo (JP)

( * ) Notice: Subject to any disclaimer, the term of this patent is extended or adjusted under 35 U.S.C. 154(b) by 0 days.

(21) Appl. No.: 10/237,901

(22) Filed: Sep. 10, 2002

(65) Prior Publication Data

US 2003/0047398 A1 Mar. 13, 2003

(30) Foreign Application Priority Data

Sep. 12, 2001 (JP) ........................................ 2001-276392
Sep. 12, 2001 (JP) ........................................ 2001-276393

(51) Int. Cl.[7] ................ F16F 9/04; F16F 9/08
(52) U.S. Cl. .................. 188/298; 188/315; 188/322.21; 267/64.27
(58) Field of Search ........................ 267/64.11, 64.13, 267/64.27, 64.28; 188/269, 297, 298, 314, 315, 322.21

(56) References Cited

U.S. PATENT DOCUMENTS

| | | | | |
|---|---|---|---|---|
| 2,571,279 A | * | 10/1951 | Myklestad | ................... 188/315 |
| 3,556,268 A | * | 1/1971 | Fister et al. | ................. 188/268 |
| 3,752,270 A | * | 8/1973 | Valdespino | ................. 188/281 |
| 3,945,663 A | * | 3/1976 | Duckett | ................... 280/6.159 |
| 4,560,042 A | * | 12/1985 | Sell et al. | ............... 188/322.21 |
| 4,742,898 A | * | 5/1988 | Lee | ............................. 188/287 |
| 5,328,005 A | * | 7/1994 | Van Breemen | ........ 188/322.21 |
| 5,443,521 A | * | 8/1995 | Knoth et al. | ................... 623/44 |
| 6,116,585 A | * | 9/2000 | Lutz | ........................ 267/64.27 |
| 6,250,612 B1 | * | 6/2001 | Doll | ........................ 267/64.11 |
| 6,382,371 B1 | * | 5/2002 | Oliver et al. | ............... 188/318 |
| 6,557,674 B2 | * | 5/2003 | Vignocchi et al. | .......... 188/315 |
| 2003/0019701 A1 | * | 1/2003 | Hodgson | .................... 188/298 |

\* cited by examiner

Primary Examiner—Christopher P. Schwartz
Assistant Examiner—Devon Kramer
(74) Attorney, Agent, or Firm—Rabin & Berdo, PC

(57) ABSTRACT

A hydraulic shock absorber comprises a cylinder (11) with an expandable and contractible piston rod (12), an outer casing (13) disposed on the outside of the cylinder (11), and a reservoir (16) defined between the outer casing and the cylinder. Due to an elastically deformable bladder (14) disposed inside the reservoir, a gas chamber (17) in which gas is sealed is formed between the bladder and the outer casing, and a reservoir chamber (18) communicated with the inside of the cylinder and designed for guiding hydraulic fluid is formed between the bladder and the cylinder. Furthermore, a gas sealing valve (23) for opening and closing a flow conduit (24) communicated with the gas chamber provided to part of the outer casing is provided to a bottom portion (19) of the outer casing, and allowing gas to enter and exit the gas chamber via the gas sealing valve makes it possible to freely adjust the gas pressure in the hydraulic shock absorber from the outside.

5 Claims, 4 Drawing Sheets

HYDRAULIC SHOCK ABSORBER

FIELD OF THE INVENTION

This invention relates to a hydraulic shock absorber in which internally sealed gas and hydraulic fluid are mutually separated and the gas pressure can be adjusted from the outside.

BACKGROUND OF THE INVENTION

There are gas-liquid separation hydraulic shock absorbers in which mixing is prevented between the gas and hydraulic fluid sealed in the interior of the hydraulic shock absorber.

A device structured as shown in FIG. 4 is an example of such a hydraulic shock absorber.

An outer casing 3 is disposed coaxially around the exterior of a cylinder 1. A reservoir 6 is provided between the cylinder 1 and the outer casing 3. A gas chamber 7, which is partitioned off by a flexible bladder 4 and in which gas is sealed, is formed in the reservoir 6. The bladder 4 is formed into a cylinder, and a smaller upper end 4a and lower end 4b are fastened airtightly to the exterior of the cylinder 1 by a clamp ring 5, and are thereby sealed so as not to allow the gas pressure sealed in the interior gas chamber 7 to leak.

A reservoir chamber 8 is formed between the outer surface of the bladder 4 and outer casing 3, and the reservoir chamber 8 is communicated with an oil chamber (not shown) inside the cylinder 1, which is filled with hydraulic fluid.

When the hydraulic shock absorber is compressed, a piston rod 2 enters the cylinder 1, and an amount of hydraulic fluid equivalent to the entered volume of the piston rod flows from the oil chamber in the cylinder into the reservoir chamber 8, and the gas chamber 7 is compressed. When the hydraulic shock absorber extends, an amount of hydraulic fluid equivalent to the extending volume of the piston rod 2 flows from the reservoir chamber 8 into the oil chamber in the cylinder, and the reservoir chamber 8 expands.

Thus, while the piston rod 2 expands and contracts, hydraulic fluid enters and leaves between the oil chamber in the cylinder and the reservoir chamber 8, damping force in the hydraulic shock absorber arises as a result of resistance occurring when the hydraulic fluid passes through a damping valve (not shown) inside the cylinder, the gas chamber 7 partitioned off by the bladder 4 is compressed and expanded along with the inflow and outflow of hydraulic fluid in the reservoir chamber 8, and spring force in the hydraulic shock absorber arises according to the gas pressure in the gas chamber 7.

In this hydraulic shock absorber, the reservoir chamber 8 and gas chamber 7 are completely separated by the bladder 4, and the hydraulic fluid and gas do not mix, so the damping characteristics of the expanding and contracting action of the piston rod 2 can always remain stable according to design. It is also possible to maintain the same damping characteristics when the upper and lower ends of the hydraulic shock absorber are reversed in a so-called inverted placement.

However, the above-mentioned hydraulic shock absorber is configured such that the gas chamber 7 partitioned off by the bladder 4 is closed off from the exterior of the shock absorber, making it impossible to change the gas pressure in the interior from the gas pressure sealed during production of the hydraulic shock absorber.

Particularly, because of a configuration in which the bladder 4 is fastened to the periphery of the cylinder 1 by the clamp ring 5 and the gas chamber 7 is formed on the inner surface of the bladder 4, communication between the gas chamber 7 and the exterior of the shock absorber has been difficult, and it has also been difficult to adjust gas pressure by filling the gas chamber 7 with gas from the exterior or discharging gas to the exterior.

Therefore, when used as a hydraulic shock absorber for a motorcycle, for example, this hydraulic shock absorber has been impossible to adjust to optimum gas spring characteristics according to driver's body weight, preferences, or the like. Another feature of this type of shock absorber is that when, for example, the components inside the cylinder are replaced, the inability to reduce the gas pressure in the gas chamber 7 causes the hydraulic fluid to be readily ejected to the exterior of the hydraulic shock absorber by the gas pressure, and makes it extremely difficult and inconvenient to replace the components.

SUMMARY OF THE INVENTION

Consequently, an object of this invention is to provide a hydraulic shock absorber in which adjustments can be made to the gas pressure in a gas chamber partitioned off by a bladder from the exterior of the shock absorber.

A further object of this invention is to provide a bladder mounting method in which a bladder for partitioning off a gas chamber can be appropriately mounted.

In order to achieve the above the objects, the invention provides a hydraulic shock absorber, comprising: a cylinder having an expandable and contactable piston rod; an outer casing disposed on the outside of the cylinder; a reservoir defined between the outer casing and the cylinder; a gas chamber formed by means of an elastically deformable bladder disposed in the reservoir, between the outer casing and the bladder, and filled with sealed gas and; a reservoir chamber formed between the bladder and the cylinder and communicated with the inside of the cylinder to guide hydraulic fluid; and a gas sealing valve provided to part of the outer casing and designed for opening and closing a flow conduit communicated with the gas chamber.

The invention further provides a method for manufacturing a hydraulic shock absorber comprising a cylinder, an outer casing disposed on the outside of the cylinder, and a reservoir provided with a gas chamber and a reservoir chamber and formed between the cylinder and the outer casing, comprising the steps of: fitting a pair of guide rings on the periphery of the cylinder having an expandable and contractible piston rod with a specific axial spacing and fixing the pair of guide rings thereto; inserting a flexible, cylindrical bladder from the outside of the cylinder and interlocking the upper and lower ends thereof with the pair of guide rings; inserting the cylinder in the outer casing along the axial direction with the bladder disposed on the outside, bringing the upper and lower ends of the bladder into close contact with the inner peripheral surface of the outer cylinder, and defining a gas chamber in the reservoir between the inner surface of the outer cylinder and the outer surface of the bladder; and forming a reservoir chamber, which is communicated with the inside of the cylinder and which guides the hydraulic fluid, between the inner surface of the bladder and the outer surface of the cylinder.

The details as well as other and advantages of the invention are set forth in the remainder of the specification and are shown in the accompanying drawings.

DESCRIPTION OF THE PREFERRED EMBODIMENTS

Embodiments of the hydraulic shock absorber of this invention are described below with reference to the drawings.

Figure 1:
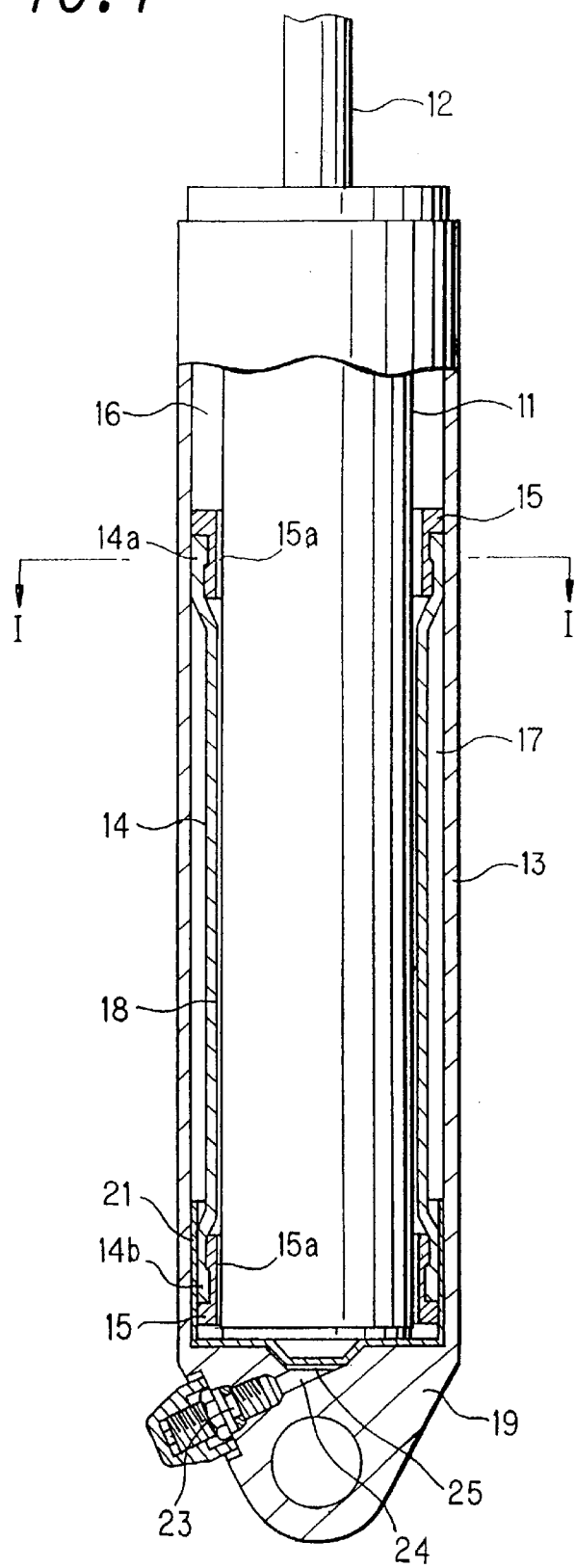
FIG. 1 is a cross-sectional diagram depicting an embodiment of this invention.

As shown in FIG. 1, the hydraulic shock absorber comprises a cylinder 11 and an outer casing 13 disposed on the outer surface thereof. A reservoir 16 is formed between the cylinder 11 and outer casing 13.

A piston (not shown) is held within the cylinder 11, and two oil chambers at the upper and lower ends in the cylinder are partitioned and formed by the piston. The piston is connected to a piston rod 12. One of the upper and lower oil chambers is compressed while the other expands due to the expansion and contraction of the piston rod 12. A specific damping force is generated when the hydraulic fluid then passes through a damping valve provided to the piston, and through a base valve provided to the lower end of the cylinder. An amount of hydraulic fluid equivalent to the moving volume of the piston rod 12 (rod cross-sectional area x stroke quantity) is transferred between the lower oil chamber in the cylinder and the reservoir 16 via the base valve (not shown). Though not shown, fluid is also transferred between the upper oil chamber and the reservoir 16 via a flow channel that penetrates the upper side wall of the cylinder.

The reservoir 16 is separated by a bladder 14 into a outside gas chamber 17 in which gas is sealed, and a inside reservoir chamber 18 filled with hydraulic fluid.

Figure 2:
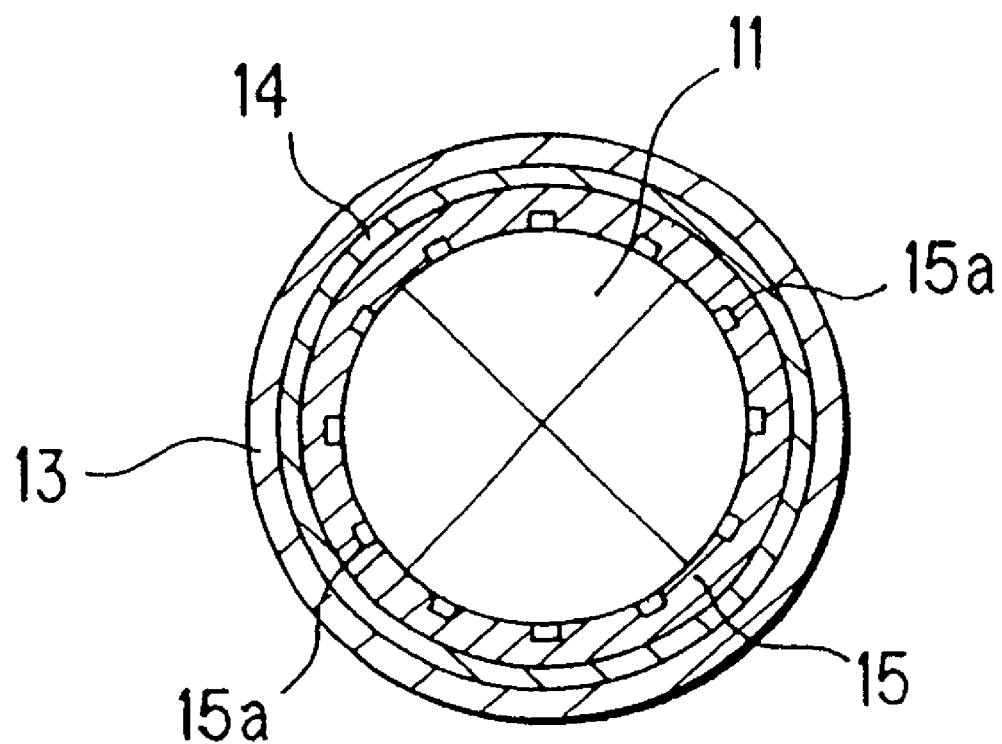
FIG. 2 is a cross-sectional diagram of line I—I in FIG. 1.

The cylindrical, flexible bladder 14 is attached to the inner surface of the outer casing 13 by crimping. A guide ring 15 fixedly interlocked with the upper and lower ends of the periphery of the cylinder 11 is provided in order to crimp the bladder 14 onto the inner surface of the outer casing. As shown in FIG. 2, a plurality of axially extending vertical grooves 15a is formed on the inner surface of the guide ring 15 that interlocks with the periphery of the cylinder 11. These vertical grooves 15a function as conduits that allow the passage of hydraulic fluid from the reservoir chamber 18.

Figure 3:
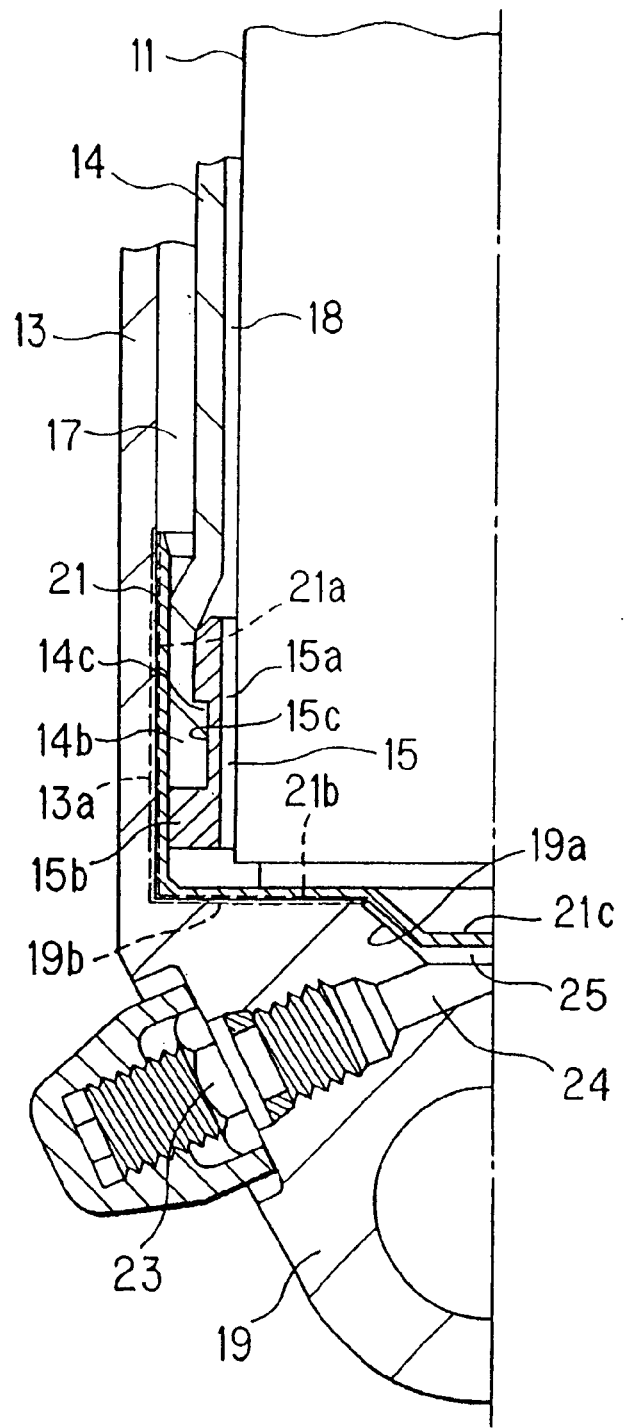
FIG. 3 is an expanded cross-sectional diagram of part of FIG. 1.
Figure 4:
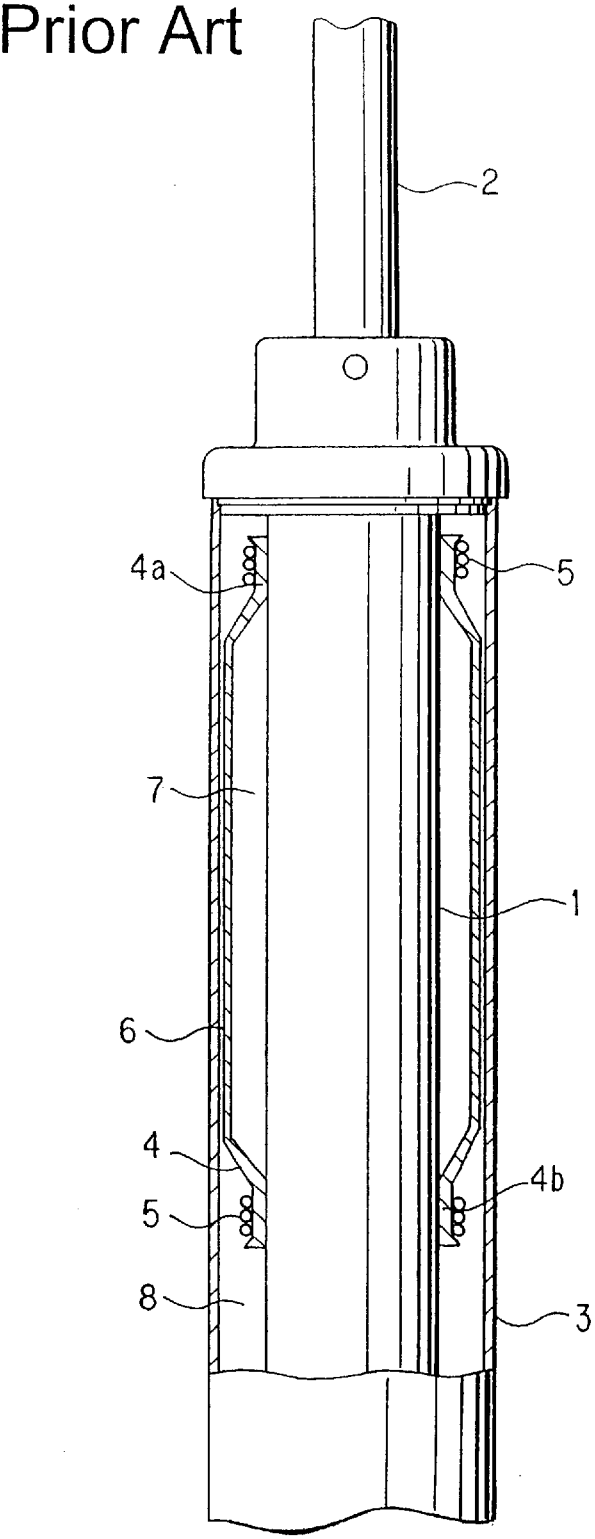
FIG. 4 is a cross-sectional diagram of a conventional example.

As shown in FIG. 3, flange 15b is formed on the exterior of the guide ring 15, and circular groove 15c is formed on the outer surface of the guide ring 15 near the flange 15b.

The upper end 14a and lower end 14b of the cylindrical bladder 14 are fashioned to have a somewhat large diameter. Circular rib 14c is formed protruding toward the interior on the inner surface of the upper end 14a and lower end 14b. The rib 14c is designed to tightly interlock with the circular groove 15c of the guide ring 15.

A cap 21 is fitted to the exterior of the lower end 14b of the bladder 14 from the lower portion of the cylinder. The cap 21 has a bottomed cylindrical shape. An outwardly expanding convexity 21c is formed in the middle of the bottom thereof.

When the cylinder 11 and outer casing 13 are joined together, the cylinder 11 is pressed from the axial direction into the inner surface of the outer casing 13 such that the cap 21 is disposed at the front in a configuration in which the bladder 14 is supported on the exterior of the cylinder 11.

The bladder 14 interlocks with the circular groove 15c of the respective guide rings 15 in the upper end 14a and lower end 14b, so there is no dropping out. The cap 21 thus adheres to the inner surface of a bottom portion 19 of the outer casing 13 when the cylinder 11 is pushed all the way down to the lower end.

In this configuration, the circular gas chamber 17 is formed between the exterior of the bladder 14 and the interior of the outer casing 13. The circular reservoir chamber 18 is formed between the interior of the bladder 14 and the exterior of the cylinder 11.

The outer surface of the upper end 14a of the resiliently elastic bladder 14 is airtightly pressure-welded to the inner surface of the outer casing 13, while the outer surface of the lower end 14b is airtightly pressure-welded to the inner surface of the cap 21. Consequently, the gas chamber 17 is not communicated with the reservoir chamber 18 at the upper and lower ends 14a and 14b of the bladder 14, and the gas sealed in the gas chamber 17 does not leak into the reservoir chamber 18.

When the cylinder 11 is inserted into the outer casing 13, the outside diameter of the guide ring 15 and the wall thickness of the bladder 14 are set to appropriate measurements that allow the outer surface of the bladder 14 to adhere to the inner surface of the outer casing 13. The wall thickness of the lower end 14b of the bladder 14 interlocking with the cap 21 is set with consideration for the wall thickness of the cap 21 so as to maintain the above-mentioned airtight pressure bonding.

Furthermore, as shown in detail is FIG. 3, a through-running gas flow conduit 24 that extends from the exterior is formed in the bottom portion 19. A gas sealing valve 23 is provided to the entrance of this gas flow conduit 24.

The gas flow conduit 24 that runs through the bottom portion 19 is connected to a space 25 partitioned off by the convexity 21c of the cap 21, which interlocks with the lower portion of the cylinder 11. The space 25 is a cone-shaped space disposed opposite a concavity 19a in the middle of the bottom portion 19 and partitioned off by the convexity 21c of the cap 21.

To communicate the space 25 with the gas chamber 17, an axially extending vertical groove 21a is formed in the outer surface of the cap 21, and a radially extending bottom groove 21b is formed in the outer surface of the cap 21 connected with the vertical groove 21a.

The outer wall of the cap 21 is formed axially longer than the lower end 14b of the bladder 14. The upper end of the vertical groove 21a opens directly to the gas chamber 17, and the inner edge of the bottom groove 21b in the bottom of the cap 21 opens in the space 25 in the bottom portion 19.

Instead of providing the above-mentioned grooves to the cap 21 in order to circulate the gas, it is also possible to form a vertical groove 13a and a bottom groove 19b in the inner surface of the outer casing 13 and the bottom surface of the bottom portion 19 at positions corresponding with the vertical groove 21a and bottom groove 21b, respectively.

However, providing the cap 21 with the vertical groove 21a and bottom groove 21b yields better productivity than providing the outer casing 13 with the vertical groove 13a and bottom groove 19b.

The hydraulic fluid in the reservoir chamber 18 passes through the vertical grooves 15a in the guide ring 15 and through gaps in the interior of the cap 21, and flows between the lower oil chambers in the cylinder via a base valve (not shown) disposed at the bottom of the cylinder 11.

As described above, the gas chamber 17 and gas flow conduit 24 are communicated via the vertical groove 21a and bottom groove 21b formed in the cap 21, and opening and closing the gas sealing valve 23 allows gas to enter the gas chamber 17 and exit the gas chamber 17.

Consequently, the gas pressure in the gas chamber 17 of the reservoir 16 can be readily adjusted from the outside in accordance with the specifics of a two-wheeled vehicle fitted with this hydraulic shock absorber, or in accordance with the body weight and preferences of the driver.

When the structural components in the hydraulic shock absorber are replaced, releasing gas pressure in advance makes it easy to replace components without the hydraulic fluid in the cylinder being ejected by the gas pressure.

Since the gas sealing valve 23 is provided to the bottom portion 19, there is no increase in the outer diameter of the hydraulic shock absorber, interference between the hydraulic shock absorber and the vehicle is prevented, and the placement of the hydraulic shock absorber in relation to the vehicle has a greater degree of freedom.

Since the gas chamber 17 in the reservoir 16 is formed between the outer surface of the bladder 14 and the inner surface of the outer casing 13, it is simple and easy to configure the gas flow conduit 24 for communicating the gas chamber 17 with the exterior in comparison with forming a gas chamber on the inside of the bladder 14. Particularly, gas can be reliably prevented from leaking into the reservoir chamber 18 by forming part of the gas flow conduit 24 using the cap 21 that interlocks with the bottom of the cylinder 11.

The gas chamber 17 is sealed by interlocking the upper and lower ends 14a and 14b of the bladder 14 with the two guide rings 15 attached at axial intervals on the periphery of the cylinder 11 and by bonding these ends to the inner surface of the outer casing 13 due to the resiliency of the bladder 14, allowing the sealing properties to be reliably maintained and the gas spring characteristics of the hydraulic shock absorber to be stably preserved over a long period of time.

When the hydraulic shock absorber is assembled, inserting and attaching the guide ring 15 to the periphery of the cylinder 11, interlocking the bladder 14 with the guide ring 15, and inserting the bladder 14 from the axial direction into the outer casing 13 in this configuration will allow the bladder 14 to be attached and supported in a simple manner between the cylinder 11 and outer casing 13, making assembly extremely easy.

It is apparent that this invention is not limited to the above-mentioned embodiments, and various alterations implemented by those skilled in the art are included within the scope of the claims.

What is claimed is:

1. A hydraulic shock absorber, comprising:
a cylinder having an expandable and contactable piston rod;
an outer casing disposed on an outside of the cylinder;
a reservoir defined between the outer casing and the cylinder;
an elastically deformable and cylindrically-shaped bladder disposed in the reservoir;
an annular gas chamber located between an inner surface of the outer casing and an outer surface of the bladder, the gas chamber being filled with sealed gas, an outer peripheral surface of upper and lower ends of the bladder being attached by pressure to an inner peripheral surface of the outer casing;
a reservoir chamber formed between the bladder and the cylinder and being in communication with an inside of the cylinder to guide hydraulic fluid;
a gas sealing valve provided at the outer casing and being configured to open and close a flow conduit that communicates with the gas chamber;
a pair of guide rings which are fitted on and fixed to a periphery of the cylinder with a specific axial spacing, the upper and lower ends of said bladder being respectively interlocked with the guide rings; and
a cap fitted over an outside of the lower end of the bladder such that a bottom of the cylinder is enclosed,
wherein the flow conduit is a gas flow conduit for communicating the gas chamber with the gas sealing valve, the gas flow conduit being formed between an outer surface of the cap and the inner surface of the outer casing.

2. The hydraulic shock absorber according to claim 1, wherein the gas sealing valve is mounted on a bottom portion of the outer casing, and the cap forms a space connecting with the gas flow conduit between the outer surface of cap and the an inner surface of the bottom portion.

3. The hydraulic shock absorber according to claim 2, wherein the gas flow conduit comprises a vertical groove with one end open to the gas chamber and being formed on the outer surface of the cap, and a bottom groove with one end communicating with the vertical groove and another end open in the space and being formed in an outer bottom surface of the cap.

4. A hydraulic shock absorber, comprising;
a cylinder having an expandable and contactable piston rod;
an outer casing disposed on an outside of the cylinder;
a reservoir defined between the outer casing and the cylinder;
an elastically deformable and cylindrically-shaped bladder disposed in the reservoir;
an annular gas chamber located between an inner surface of the outer casing and an outer surface of the bladder, the gas chamber being filled with sealed gas, an outer peripheral surface of upper and lower ends of the bladder being attached by pressure to an inner peripheral surface of the outer casing;
a reservoir chamber formed between the bladder and the cylinder and being in communication with an inside of the cylinder to guide hydraulic fluid;
a gas sealing valve provided at the outer casing and being configured to open and close a flow conduit that communicates with the gas chamber; and
a pair of guide rings which are fitted on and fixed to a periphery of the cylinder with a specific axial spacing, the upper and lower ends of said bladder being respectively interlocked with the guide rings,
wherein a vertical groove which allows a flow of the hydraulic fluid is formed on an inner peripheral surface of the respective guide rings, and the reservoir chamber communicates with the inside of the cylinder via the vertical groove.

5. A method for manufacturing a hydraulic shock absorber, comprising:
fitting a pair of guide rings on a periphery of a cylinder with a specific axial spacing, and fixing the pair of guide rings thereto;

inserting a flexible, cylindrical bladder from an outside of the cylinder and interlocking upper and lower ends thereof with the pair of guide rings;

inserting the cylinder in an outer casing alone an axial direction with the bladder disposed on the outside of the cylinder, bringing the upper and lower ends of the bladder into close contact with an inner peripheral surface of the outer casing, and defining a gas chamber between the inner surface of the outer casing and an outer surface of the bladder;

forming a reservoir chamber, which communicates with an inside of the cylinder and which guides hydraulic fluid, between an inner surface of the bladder and an outer surface of the cylinder; and forming annular grooves on peripheries of the pair of guide rings, and providing annular ribs that interlock with these annular grooves to an inner periphery of the upper and lower ends of the bladder.

* * * * *